(12) United States Patent
Takeru

(10) Patent No.: US 9,460,492 B2
(45) Date of Patent: Oct. 4, 2016

(54) APPARATUS AND METHOD FOR IMAGE PROCESSING

(71) Applicant: HANWHA TECHWIN CO., LTD., Changwon-Si (KR)

(72) Inventor: Tsuzuki Takeru, Changwon-si (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 177 days.

(21) Appl. No.: 14/270,851

(22) Filed: May 6, 2014

(65) Prior Publication Data

US 2014/0334741 A1  Nov. 13, 2014

(30) Foreign Application Priority Data

May 10, 2013 (JP) .................. 2013-0100509
Nov. 8, 2013 (KR) ................ 10-2013-0135848

(51) Int. Cl.
*G06K 9/40* (2006.01)
*G06T 5/00* (2006.01)
*G06T 5/50* (2006.01)

(52) U.S. Cl.
CPC ............ *G06T 5/002* (2013.01); *G06T 5/50* (2013.01); *G06T 2207/10144* (2013.01); *G06T 2207/20221* (2013.01)

(58) Field of Classification Search
CPC .......... G06T 2207/20221; G06T 5/50; G06T 2207/10144; G06T 5/002
See application file for complete search history.

(56) References Cited

U.S. PATENT DOCUMENTS

| 7,409,104 B2 * | 8/2008 | Vitsnudel ............... G06T 5/004 348/362 |
| 7,450,782 B2 | 11/2008 | Lim et al. |
| 8,462,214 B2 | 6/2013 | Oh et al. |
| 8,508,619 B2 | 8/2013 | Oh et al. |
| 2011/0058050 A1 * | 3/2011 | Lasang .................. H04N 5/144 348/208.4 |

FOREIGN PATENT DOCUMENTS

| JP | 5133921 B2 | 1/2013 |
| KR | 10-2005-0022748 A | 3/2005 |
| KR | 10-2011-0009936 A | 1/2011 |
| KR | 10-2011-0032344 A | 3/2011 |

* cited by examiner

*Primary Examiner* — Bhavesh Mehta
*Assistant Examiner* — Ian Lemieux
(74) *Attorney, Agent, or Firm* — Sughrue Mion, PLLC

(57) ABSTRACT

Disclosed is an apparatus for image processing including a first low pass filter (LPF) which removes high-frequency components from selection information about image data selection between a long-exposure image and a short-exposure image, a movement detector which obtains movement detection information by detecting movement from at least one of the images, a second LPF which removes high-frequency components from the movement detection information, a selector which obtains selection results by selecting one of the selection information from which the high-frequency components are not removed by the first LPF and the selection information from which the high-frequency components are removed by the first LPF, for each pixel group based on the movement detection information from which the high-frequency components have been removed, and a composer which composes the long-exposure image and the short-exposure image based on the selection results.

14 Claims, 5 Drawing Sheets

SHORT-EXPOSURE IMAGE

LONG-EXPOSURE IMAGE

SELECTION INFORMATION

COMPOSITE IMAGE

SELECTION INFORMATION
+ FIRST LPF

MOVEMENT DETECTION
INFORMATION

MOVEMENT DETECTION
INFORMATION + SECOND LPF

SELECTION RESULTS

COMPOSITE IMAGE

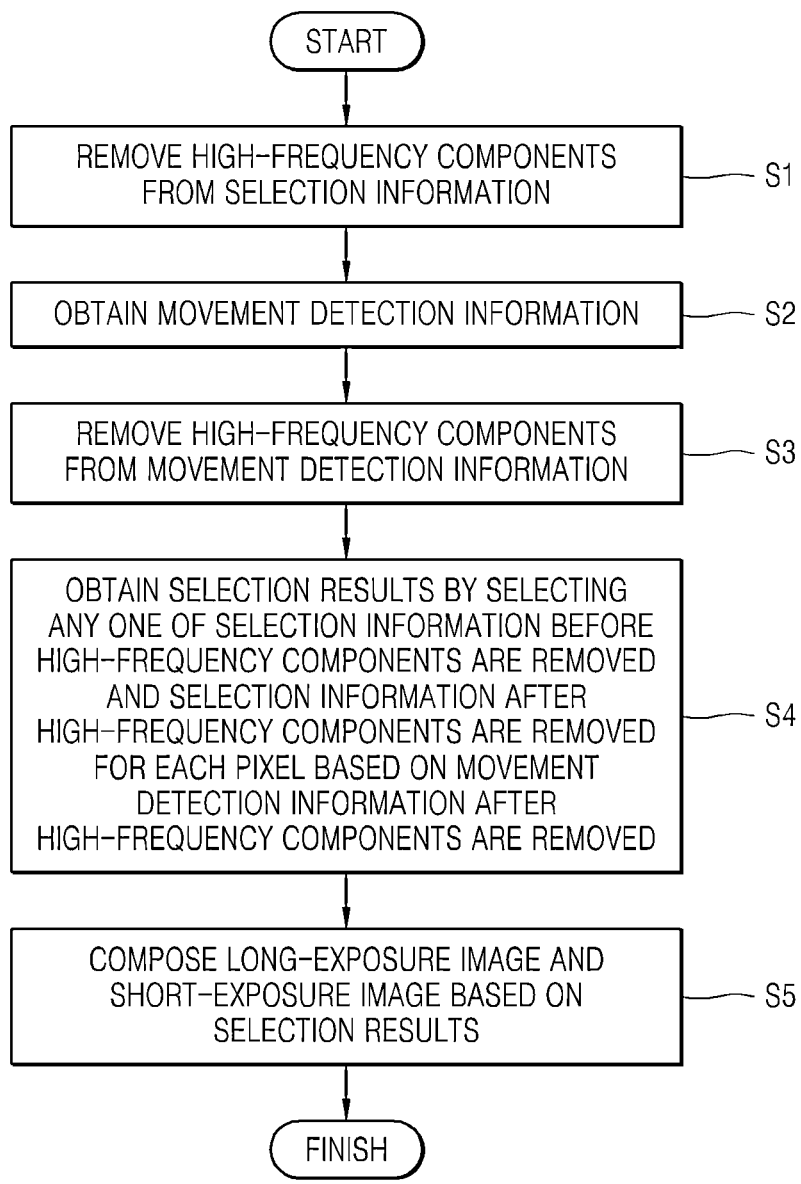

APPARATUS AND METHOD FOR IMAGE PROCESSING

CROSS-REFERENCE TO RELATED APPLICATIONS

This application claims priority from Japanese Patent Application No. 2013-0100509, filed on May 10, 2013, in the Japanese Patent Office and Korean Patent Application No. 10-2013-0135848, filed on Nov. 8, 2013, in the Korean Intellectual Property Office, the disclosures of which are incorporated herein in their entireties by reference.

BACKGROUND

1. Field

Apparatuses and methods consistent with exemplary embodiments of the inventive concept relate to image processing.

2. Description of the Related Art

Recently, there has been an increase in the use of a photography function referred to as a wide dynamic range (WDR) function or a high dynamic range (HDR) function. According to the WDR or HDR function, an image, in which a dynamic range exceeding a range that may be photographed by a sensor, is captured by continuously capturing and compositing an image of a short-time exposure (hereinafter, referred to as "short-exposure image") and an image of a long-time exposure (hereinafter, referred to as "long-exposure image"). This photography function is very effective, particularly when an image with a high contrast ratio, such as a backlit image, is captured.

However, since a short-exposure image and a long-exposure image captured at time intervals are composed, if an object moves, a mismatch occurs during composition and an artifact in which double contours are shown occurs. As a WDR composition scheme against movement, there is a technology disclosed in Japanese Unexamined Patent Application, First Publication No. 2011-004353. According to this technology, a common area is detected from two images with different exposure, motion compensation is performed by correcting the position of the common area, and then the two images are composed.

The above technology may be used for a case in which an entire image has movement, but may not handle localized movement in partial areas constituting an image, thereby resulting in unnatural artifacts.

SUMMARY

One or more exemplary embodiments provide an apparatus and method for improved image processing.

Various aspects will be set forth in part in the description which follows and, in part, will be apparent from the description, or may be learned by practice of the presented embodiments.

According to an aspect of an exemplary embodiment, there is provided an image processing apparatus which may include: a first low pass filter (LPF) configured to remove high-frequency components from selection information about image data selection between a long-exposure image and a short-exposure image; a movement detector configured to obtain movement detection information by detecting movement from at least one of the long-exposure image and the short-exposure image; a second LPF configured to remove high-frequency components from the movement detection information; a selector configured to obtain selection results by selecting one of the selection information from which the high-frequency components are not removed by the first LPF and the selection information from which the high-frequency components are removed by the first LPF, for each pixel group based on the movement detection information from which the high-frequency components have been removed; and a composer which composes the long-exposure image and the short-exposure image based on the selection results. The selection information about the image data selection may indicate which image data between the long-exposure image and the short-exposure image is to be used for the each pixel group, or pixel mixture ratios of the long-exposure image and the short-exposure image for the each pixel group.

The selector may be configured to select the selection information from which the high-frequency components are removed for a movement area detected from the movement detection information from which the high-frequency components are removed, and select the selection information from which the high-frequency components are not removed for a non-movement area detected from the movement detection information from which the high-frequency components are removed.

According to an aspect of another exemplary embodiment, there is provided a method for image processing which may include: removing high-frequency components from selection information about image data selection between a long-exposure image and a short-exposure image; obtaining movement detection information by detecting movement from at least one of the long-exposure image and the short-exposure image; removing high-frequency components from the movement detection information; obtaining selection results by selecting one of the selection information from which the high-frequency components are not removed by the first LPF and the selection information from which the high-frequency components are removed by the first LPF, for each pixel group based on the movement detection information from which the high-frequency components have been removed; and composing the long-exposure image and the short-exposure image based on the selection results.

BRIEF DESCRIPTION OF THE DRAWINGS

These and/or other aspects will become apparent and more readily appreciated from the following description of the exemplary embodiments, taken in conjunction with the accompanying drawings, in which:

FIG. 5 is a flowchart of a method for image processing according to an exemplary embodiment.

DETAILED DESCRIPTION OF EXEMPLARY EMBODIMENTS

Figure 1:
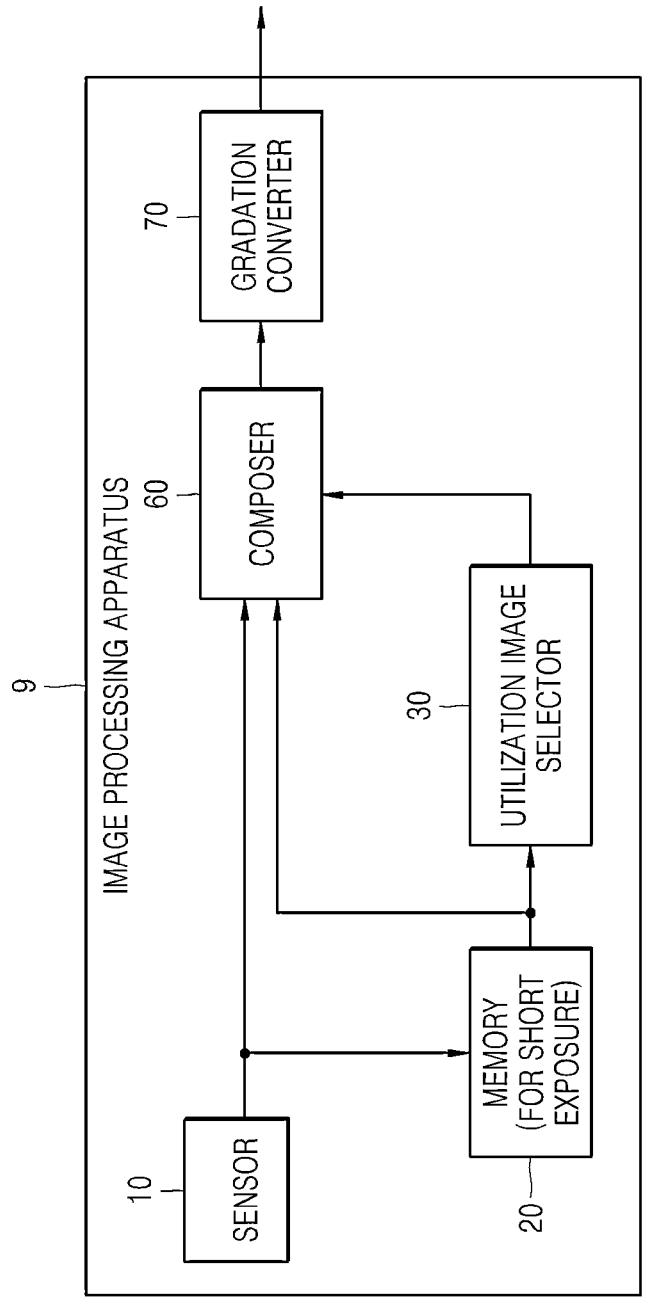
FIG. 1 is a diagram illustrating an image processing apparatus according to an exemplary embodiment.

Reference will now be made in detail to exemplary embodiments which are illustrated in the accompanying drawings, wherein like reference numerals refer to like elements throughout. In this regard, these embodiments may have different forms and should not be construed as being limited to the descriptions set forth herein.

In this specification and the drawings, a plurality of components having substantially the same functional configuration may be distinguished by attaching different letters behind the same symbol. However, when it is unnecessary to distinguish a plurality of components having substantially the same functional configuration from each other, only the same symbol is used.

FIG. 1 is a diagram illustrating an image processing apparatus according to an exemplary embodiment. In the present embodiment, an image processing apparatus 9 implements general wide dynamic range (WDR) composition. For the WDR composition, the image processing apparatus 9 continuously captures two images with different exposure settings of a sensor 10. The image processing apparatus 9 may perform short-exposure photography and then long-exposure photography, but the inventive concept is not limited to the sequence. In the present embodiment, an example in which short-exposure photography is performed first is described. A captured short-exposure image is stored in a memory 20. When the short-exposure photography is finished, the image processing apparatus 9 changes an exposure setting and performs long-exposure photography.

In FIG. 1, the image processing apparatus 9 has one common system for outputting long-exposure images and short-exposure images, and the sensor 10 time-divisionally outputs a long-exposure image and a short-exposure image. However, a long-exposure image and a short-exposure image may be captured at the same time. In this case, the image processing apparatus 9 may have two systems, that is, a system for outputting long-exposure images from the sensor 10 and a system for outputting short-exposure images from the sensor 10.

With reference to a long-exposure image detected by the sensor 10 and a short-exposure image read from the memory 20, a utilization image selector 30 detects a saturation state, movement, etc. of each of the long-exposure image and the short-exposure image, and generates selection information for selecting the short-exposure image or the long-exposure image as a utilization image. A composer 60 receives the selection information from the utilization image selector 30 and composes the short-exposure image and the long-exposure image based on the selection information, thereby generating a WDR image.

A gradation converter 70 performs compression processing for converging a bit range of an image signal that has a wide dynamic range to a predetermined bit range, and gradation correction for making a resultant image close to a scene seen by humans, on the WDR image generated by the composer 60. The compression processing and the gradation correction may be performed at the same time or different times.

Figure 2A:
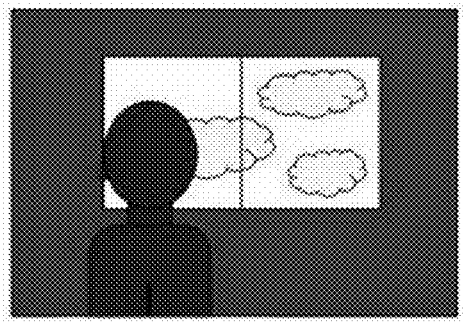
FIGS. 2A-2D show examples of a short-exposure image, a long-exposure image, selection information, and a composite image, respectively, according to exemplary embodiments.
Figure 2B:
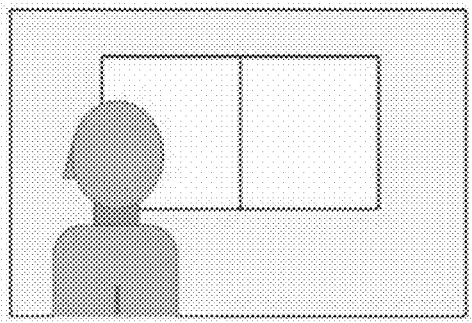

FIGS. 2A-2D show examples of a short-exposure image, a long-exposure image, selection information, and a composite image, respectively, to exemplary embodiments. The short-exposure image and the long-exposure image shown in FIGS. 2A and 2B are obtained by capturing the interior of a building with a window through which the bright outside of the building is shown at daytime in the background. A person photographed in front of the window is moving to the left.

Figure 2C:
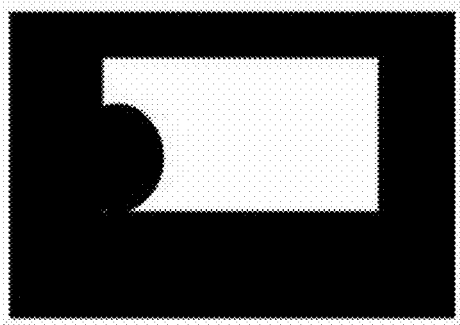
Figure 2D:
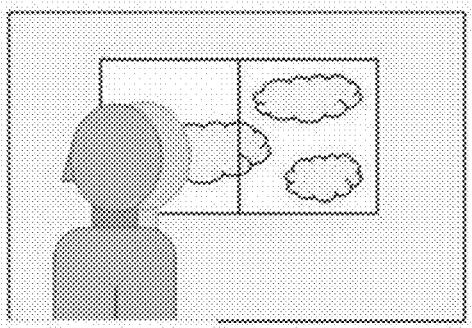

For example, the selection information of FIG. 2C generated by the utilization image selector 30 may be information about image data selection between a long-exposure image and a short-exposure image. Specifically, the selection information maybe a set of binary data indicating which image data between the long-exposure image and the short-exposure image is to be used for each pixel to compose the long-exposure image and the short-exposure image. In this case, as the selection information shown in FIG. 2C, an area, in which the long-exposure image is used, may be a black area, and an area, in which the short-exposure image is used, may be a white area. With regard to the selection information shown in FIG. 2C, selection information according to an exemplary embodiment may be image data corresponding to binary data in which one bit corresponds to one pixel.

Based on the selection information generated this way, the composer 60 composes the short-exposure image and the long-exposure image. With regard to the composite image of FIG. 2D, in the present embodiment, the selection information is generated without considering localized movement, and thus, images between which the positions of an object are mismatched are composed in an area where there is movement. Accordingly, as shown in the composite image shown in FIG. 2D, a position mismatch occurs at the boundary between the bright window and the moving person, and a distinct artifact in which double contours are shown occurs.

However, according to another exemplary embodiment of the inventive concept, a WDR composite image, in which no artifact is shown even when there is localized movement, may be obtained as discussed herebelow.

Figure 3:
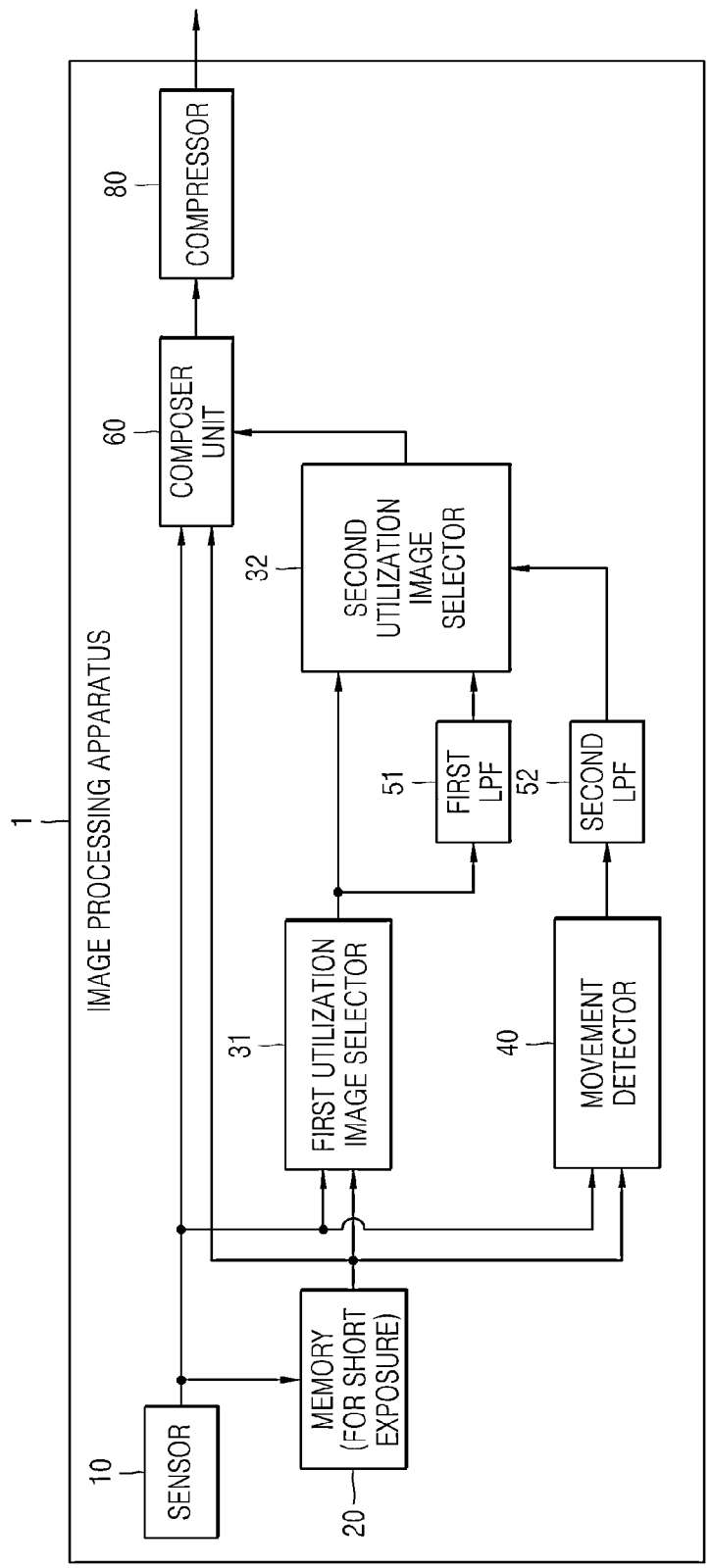
FIG. 3 is a diagram illustrating an image processing apparatus according to another exemplary embodiment.

FIG. 3 is a diagram illustrating an image processing apparatus according to another exemplary embodiment. As shown in FIG. 3, an image processing apparatus 1 includes a sensor 10, a memory 20, a first utilization image selector 31, a second utilization image selector 32, a movement detector 40, a first low pass filter (LPF) 51, a second LPF 52, a composer 60, and a compressor 80. Functions of the functional blocks of the image processing apparatus 1 will be sequentially described in detail below.

The image processing apparatus 1 continuously captures two images with different exposure settings of the sensor 10. For example, the image processing apparatus 1 may perform short-exposure photography and then long-exposure photography, but the inventive concept is not limited to the sequence. In the present embodiment, short-exposure photography is performed first, and then long-exposure photography is performed next. A captured short-exposure image is stored in the memory 20. When the short-exposure photography is finished, the image processing apparatus 1 changes an exposure setting and performs long-exposure photography.

In the embodiment shown in FIG. 3, the image processing apparatus 1 has one common system for outputting long-exposure images and short-exposure images, and the sensor 10 time-divisionally outputs a long-exposure image and a short-exposure image. However, a long-exposure image and a short-exposure image may be captured at the same time. In this case, the image processing apparatus 1 may have two systems, that is, a system for outputting long-exposure images from the sensor 10 and a system for outputting short-exposure images from the sensor 10. A shutter time for each of a short-exposure image and a long-exposure image is determined according to, for example, the dynamic range of an object to be photographed, specifications of the sensor 10, and so on.

In the description of exemplary embodiments of the inventive concept, the terms "short-exposure image" and "long-exposure image" are used, but these terms do not limit the absolute exposure times of two captured images. Therefore, when two images are captured with different exposure times, an image with a relatively short exposure time between the two images may be a short-exposure image, and an image with a relatively long exposure time may be a long-exposure image.

The sensor 10 may be an image sensor that forms an image on a light-receiving plane of an imaging device from light incident on the sensor 10, converts the image-forming light into an amount of charge, and converts the amount of charge into an electrical signal. The type of the image sensor is not particularly limited, and may be, for example, a charge-coupled device (CCD) or a complementary metal oxide semiconductor (CMOS) sensor.

The first utilization image selector 31 detects a saturation state, movement, etc. of each of a long-exposure image detected by the sensor 10 and a short-exposure image read from the memory 20, with reference to the long-exposure image and the short-exposure image. Then, the first utilization image selector 31 generates selection information for selecting any one of the short-exposure image and the long-exposure image as a utilization image. Various algorithms may be used to select any one of the short-exposure image and the long-exposure image.

For example, there is a high probability that an area saturated in a long-exposure image will not be saturated in a short-exposure image, and thus, the short-exposure image may be selected as a utilization image of this area. However, this processing alone may not prevent an artifact in which double contours are shown in an area where there is big movement, or another artifact. Therefore, processing for detecting movement and reducing the phenomena in which double contours are shown may be performed. There is no particular limitation on an algorithm for the processing and also for selecting any one of the short-exposure image and the long-exposure image.

As described above, the selection information may be information about image data selection between a long-exposure image and a short-exposure image. According to an exemplary embodiment, the selection information may be a set of binary data (0 or 1) indicating which image data between the short-exposure image and the long-exposure image is to be used for each pixel to compose the long-exposure image and the short-exposure image. According to another exemplary embodiment, the selection information may be a set of pixel-specific mixture ratios indicating ratios at which the long-exposure image and the short-exposure image are mixed. For example, the first utilization image selector 31 may set a ratio of the short-exposure image to be higher than that of the long-exposure image in mixing the two images if the degree of saturation of the long-exposure image becomes higher than that of the short-exposure image. Also, the first utilization image selector 31 may set a ratio of the short-exposure image to be higher than that of the long-exposure image if movement in the short-exposure image or the long-exposure image becomes bigger. There is no particular limitation on an algorithm for calculating a mixture ratio of the short-exposure image and the long-exposure image.

A case where the first utilization image selector 31 generates selection information indicating pixel-specific mixture ratios of the long-exposure image and the short-exposure image, and outputs the selection information to the first LPF 51 and the second utilization image selector 32 will be described below as an example.

Figure 4A:
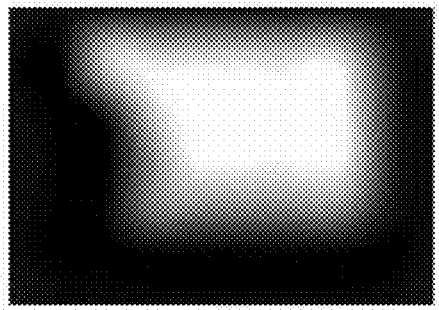
FIGS. 4A-4E shows examples of various kinds of information in a wide dynamic range (WDR) composition technology, according to exemplary embodiments.

The first LPF 51 removes high-frequency components from the selection information. This function gradates the selection information so that the composer 60 may seamlessly connect edges of the short-exposure image and the long-exposure image when composing the short-exposure image and the long-exposure image. Here, the term "gradate" means to cause a pixel value, etc. to gradually and smoothly change. "Selection information+First LPF" of FIG. 4A shows an example of selection information obtained by removing high-frequency components.

The bit precision of the first LPF 51 may be set only enough to output a signal providing seamless connection of the edges of the short-exposure image and the long-exposure image. There is no particular limitation on a method of gradating the selection information, and various schemes may be used as the gradation method. However, the gradation method may be determined in consideration of gradation effects, computation for gradation, the scale of a circuit, and so on.

The movement detector 40 detects movement. A scheme of detecting movement is not particularly limited, and may be, for example, a scheme of detecting movement from a difference between a long-exposure image and a short-exposure image, a scheme of detecting movement from a difference between a plurality of long-exposure images, a scheme of detecting movement from a difference between a plurality of short-exposure images, or another scheme. When the scheme of detecting movement from a difference between a long-exposure image and a short-exposure image is employed, the movement detector 40 may multiply the short-exposure image by a gain dependent on exposure and then calculate the difference because there is difference in brightness between the long-exposure image and the short-exposure image.

Figure 4B:

In addition, the movement detector 40 detects a movement area and a non-movement area based on the detected movement, thereby obtaining movement detection information. For example, the movement area is an area that has a movement value larger than a threshold value, and the non-movement area is an area that has a movement value smaller than the threshold value. An area that has a movement value equal to the threshold value may be detected as any of the movement and non-movement areas. Referring to "Movement detection information" of FIG. 4B, a movement area is displayed as a white area, and a non-movement area is displayed as a black area.

Figure 4C:
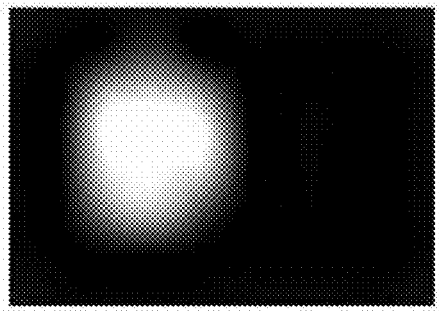

The second LPF 52 removes high-frequency components from the movement detection information. This function gradates the movement detection information so that a meaningful area may expand. "Movement detection information+Second LPF" of FIG. 4C shows an example of movement detection information obtained by removing high-frequency components. Referring to this example, a movement area expands through a process of removing high-frequency components from movement detection information.

The second LPF 52 not only removes high-frequency components from the movement detection information but also may multiply a result of the removal of high-frequency components from the movement detection information by a predetermined gain. Then, the meaningful area may further expand. Like the first LPF 51, the bit precision of the second LPF 52 may be set only enough to output a signal providing seamless connection of edges of the movement area and the non-movement area.

For each pixel, the second utilization image selector 32 selects any one of selection information which includes high-frequency components and selection information from which high-frequency components have been removed based on the output of the first utilization image selector 31 which includes high-frequency components, the output of the first LPF 51 which has removed high-frequency components from output of the first utilization image selector 31 and the output of the second LPF 52 which is the movement detection information from which high-frequency components have been removed, thereby obtaining selection results. For example, the second utilization image selector 32 may select the selection information from which high-frequency components have been removed for a movement area which is detected from the output of the second LPF 52, and select the selection information which includes high-frequency components for a non-movement area detected from the outputs of the first utilization image selector 31, the first LPF 51 and the second LPF 52.

Figure 4D:
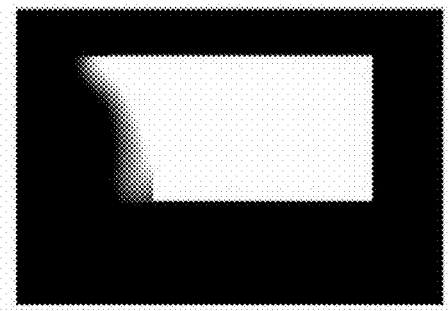

With regard to "Selection results" of FIG. 4D, "Selection information+First LPF" from which high-frequency components have been removed is selected for an area corresponding to the movement area (white area) shown in "Movement detection information+Second LPF". Also, selection information which includes high-frequency components is selected for an area corresponding to the non-movement area (black area) shown in "Movement detection information+Second LPF".

The composer 60 receives the selection results from the second utilization image selector 32 and composes the short-exposure image and the long-exposure image based on the selection results, thereby generating a WDR image. For example, a value indicating that the long-exposure image is selected is assumed to be "0", and a value indicating that the short-exposure image is selected is assumed to be "1". In this case, the composer 60 may set a mixture ratio constituting the selection results to $\alpha$, calculate $\alpha \times$(pixel value of short-exposure image)$+(1-\alpha)\times$(pixel value of short-exposure image) for each pixel by using the long-exposure image and the short-exposure image, and use the calculation results as pixel values of the composite image (WDR image). There is no particular limitation on a composition scheme of the composer 60.

The compressor 80 performs compression processing for converging a bit range of an image signal that has a wide dynamic range to a predetermined bit range on the WDR image generated by the composer 60. The rear end of the compressor 80 is connected to an image processing engine including, for example, a demosaicing unit that generates a red, green, and blue (RGB) plane from Bayer data, an edge enhancement unit, a color management unit, and so on. Therefore, the amount of data of an output signal from the compressor 80 may be adjusted to be appropriate to, for example, the size of input data to the image processing engine (e.g., about 12 bits). Since a reduction in the data size alone may result in conversion to a dark image, a high-brightness side may be strongly compressed so that a resultant image is as close to visual characteristics of human.

Figure 4E:
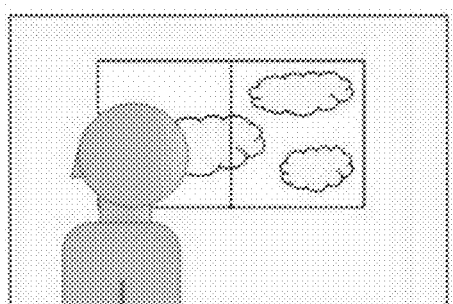

"Composite image" shown in FIG. 4E is an example of a composite image output by the image processing apparatus 1 according to an exemplary embodiment. This example shows a composite image in which artifacts are reduced by seamlessly connecting a short-exposure image and a long-exposure image at a contour of a moving object (a person in this example). While edges of the short-exposure image and the long-exposure image are seamlessly connected in a movement area, edges of the short-exposure image and the long-exposure image do not blur in a non-movement area.

FIG. 5 is a flowchart of an example of operation of the image processing apparatus 1, according to an exemplary embodiment. With reference to FIG. 5, a case where selection information generated by the first utilization image selector 31 is output to the first LPF 51 and the second utilization image selector 32 will be described as an example. As illustrated in FIG. 5, first, the first LPF 51 removes high-frequency components from selection information (S1). Subsequently, the movement detector 40 detects movement, thereby obtaining movement detection information (S2). The second LPF 52 removes high-frequency components from the movement detection information (S 3).

For each pixel, the second utilization image selector 32 selects any one of selection information from which high-frequency components have not been removed and selection information from which high-frequency components have been removed based on at least the movement detection information from which the high-frequency components have been removed, thereby obtaining selection results (S4). Subsequently, the composer 60 composes a long-exposure image and a short-exposure image based on the selection results (S5). A composite image generated as mentioned above may be compressed by the compressor 80.

According to the above embodiments, the image processing apparatus 1 includes the first LPF 51 that removes high-frequency components from selection information indicating pixel-specific mixture ratios of a long-exposure image and a short-exposure image, the movement detector 40 that detects movement to obtain movement detection information, the second LPF 52 that removes high-frequency components from the movement detection information, the second utilization image selector 32 that obtains selection results by selecting any one of selection information before the removal of high-frequency components and selection information after the removal of high-frequency components for each pixel based on the movement detection information after the removal of high-frequency components, and the composer 60 that composes the long-exposure image and the short-exposure image based on the selection results.

By using the above configuration, a short-exposure image and a long-exposure image may be seamlessly connected in a movement area, and it is possible to reduce distinct artifacts that a moving object is shown with double contours. In addition, in an image including a non-moving object or a non-movement area of an image including a moving object, a drastic change may be made between a short-exposure image and a long-exposure image. In this case, a boundary between the short-exposure image and the long-exposure image hardly blurs.

As described above, an apparatus and method for image processing, according to the above embodiments, may make it possible to obtain a WDR composite image in which no artifact is shown even when there is localized movement.

In addition, the image processing method illustrated in FIG. 5 can also be implemented through computer-readable code/instructions in/on a medium, e.g., a computer-readable medium, to control at least one processing element to implement any above described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, DVDs, etc.), and transmission media such as Internet transmission media. Thus, the medium may be such a defined and measurable structure including or carrying a signal or information, such as a device carrying a bitstream according to one or more embodiments of the present invention. The media may also be a distributed network, so that the computer-readable code is stored/transferred and executed in a distributed fashion. Furthermore, the components or elements represented by a block as illustrated in FIGS. 1 and 3 may be embodied as the various numbers of hardware, software and/or firmware structures that execute respective functions described above, according to exemplary embodiments. For example, these components or elements may use a direct circuit structure, such as a memory, processing, logic, a look-up table, etc. that may execute the respective functions through controls of one or more microprocessors or other control apparatuses. These components or elements may be specifically embodied by a module, a program, or a part of code, which contains one or more executable instructions for performing specified logic functions. Also, at least one of the above components, elements or units may further include a processor such as a central processing unit (CPU) that performs the respective functions, a microprocessor, or the like. Also, one or more components or elements in FIGS. 1 and 3 may be configured as one single component or element according to various exemplary embodiments.

It should be understood that the embodiments described above should be considered in a descriptive sense only and not for purposes of limitation. Descriptions of features or aspects within each embodiment should typically be considered as available for other similar features or aspects in other embodiments.

While one or more exemplary embodiments have been described with reference to the drawings, it will be understood by those of ordinary skill in the art that various changes in form and details may be made therein without departing from the spirit and scope of the inventive concept as defined by the following claims.

What is claimed is:

1. An image processing apparatus for generating a composite image, the apparatus comprising at least one processor to implement:
    a first low pass filter (LPF) configured to remove high-frequency components from first selection information about image data selection between a long-exposure image and a short-exposure image for each pixel of the composite image, thereby generating second selection information;
    a movement detector configured to obtain first movement detection information that identifies pixels corresponding to movement captured in at least one of the long-exposure image and the short-exposure image;
    a second LPF configured to remove high-frequency components from the first movement detection information, thereby generating second movement detection information;
    a selector configured to obtain selection results by exclusively selecting one of the first selection information and the second selection information for each pixel of the composite image based on the second movement detection information; and
    a composer configured to generate the composite image by combining the long-exposure image and the short-exposure image based on the selection results.

2. The apparatus of claim 1, wherein the at least one processor further comprises another selector configured to generate the first selection information.

3. The apparatus of claim 1, wherein the first selection information indicates which image data between the long-exposure image and the short-exposure image is to be used for the each pixel of the composite image, or pixel mixture ratios of the long-exposure image and the short-exposure image for each pixel of the composite image.

4. The apparatus of claim 1, wherein the selector is configured to:
    select the second selection information for second pixels of the composite image which are identified by the second movement detection information as corresponding to the movement, and select the first selection information for first pixels of the composite image which are different from the second pixels.

5. The apparatus of claim 4, wherein the second selection information specifies image data selection between the long-exposure image and the short-exposure image.

6. The apparatus of claim 5, wherein the second selection information indicates which image data between the long-exposure image and the short-exposure image is to be used for each pixel of the composite image, or pixel mixture ratios of the long-exposure image and the short-exposure image for each pixel of the composite image.

7. The apparatus of claim 4, wherein the second selection information indicates which image data between the long-exposure image and the short-exposure image is to be used for each pixel of the composite image, or pixel mixture ratios of the long-exposure image and the short-exposure image for each pixel of the composite image.

8. A method for generating a composite image, the method comprising:
    removing high-frequency components from first selection information about image data selection between a long-exposure image and a short-exposure image for each pixel of the composite image, thereby generating second selection information;
    obtaining first movement detection information that identifies pixels corresponding to movement captured in at least one of the long-exposure image and the short-exposure image;
    removing high-frequency components from the first movement detection information, thereby generating second movement detection information;
    obtaining selection results by exclusively selecting one of the first selection information and the second selection information for each pixel of the composite image based on the second movement detection information; and
    generate the composite image by combining the long-exposure image and the short-exposure image based on the selection results.

9. The method of claim 8, further comprising obtaining the long-exposure image and the short-exposure image using one sensor in a time-division manner to generate the first selection information about the image data selection between the long-exposure image and the short-exposure image.

10. The method of claim 8, wherein the first selection information indicates which image data between the long-exposure image and the short-exposure image is to be used for each pixel of the composite image, or pixel mixture ratios of the long-exposure image and the short-exposure image for each pixel of the composite image.

11. The method of claim 8, wherein the selection results are obtained by:
    selecting the second selection information for second pixels of the composite image which are identified by the second movement detection information as corresponding to the movement, and select the first selection information for first pixels of the composite image which are different from the second pixels.

12. The method of claim 11, further comprising obtaining the long-exposure image and the short-exposure image using one sensor in a time-division manner to generate the first selection information about the image data selection between the long-exposure image and the short-exposure image.

13. The method of claim 12, wherein the second selection information indicates which image data between the long-exposure image and the short-exposure image is to be used for each pixel of the composite image, or pixel mixture ratios of the long-exposure image and the short-exposure image for each pixel of the composite image.

14. The method of claim 11, wherein the second selection information indicates which image data between the long-exposure image and the short-exposure image is to be used for each pixel of the composite image, or pixel mixture ratios of the long-exposure image and the short-exposure image for each pixel of the composite image.

\* \* \* \* \*